US011796632B2

(12) United States Patent
Wu et al.

(10) Patent No.: US 11,796,632 B2
(45) Date of Patent: Oct. 24, 2023

(54) FREQUENCY AND TIME OFFSET MODULATION CHIRP MIMO RADAR

(71) Applicant: NXP USA, Inc., Austin, TX (US)

(72) Inventors: Ryan Haoyun Wu, San Jose, CA (US); Douglas Alan Garrity, Gilbert, AZ (US); Maik Brett, Taufkirchen (DE)

(73) Assignee: NXP USA, Inc., Austin, TX (US)

( * ) Notice: Subject to any disclaimer, the term of this patent is extended or adjusted under 35 U.S.C. 154(b) by 228 days.

(21) Appl. No.: 17/125,202

(22) Filed: Dec. 17, 2020

(65) Prior Publication Data

US 2022/0196795 A1    Jun. 23, 2022

(51) Int. Cl.
*G01S 7/35*    (2006.01)
*G01S 7/03*    (2006.01)
(Continued)

(52) U.S. Cl.
CPC .............. *G01S 7/354* (2013.01); *G01S 7/038* (2013.01); *G01S 13/584* (2013.01); *G01S 2013/0263* (2013.01)

(58) Field of Classification Search
CPC .... G01S 13/931; G01S 13/343; G01S 13/345; G01S 13/584; G01S 13/325;
(Continued)

(56) References Cited

U.S. PATENT DOCUMENTS 4,586,044 A * 4/1986 Hopwood ............... G01S 7/282
                                                                    342/194
5,142,281 A * 8/1992 Park ........................ G01S 5/10
                                                                    340/991
(Continued)

FOREIGN PATENT DOCUMENTS

CN        112859057 A  *  5/2021

OTHER PUBLICATIONS

Pfeffer, C. et al., "An IQ-Modulator Based Heterodyne 77-GHz FMCW Colocated MIMO Radar System", 2012 IEEE MTT-S International Microwave Symposium Digest, Jun. 17, 2012, pp. 1-3, IEEE, Piscataway, NJ, USA.
(Continued)

*Primary Examiner* — Vladimir Magloire
*Assistant Examiner* — Michael W Justice

(57) ABSTRACT

A radar system utilizing a linear chirp that can achieve a larger MIMO virtual array than traditional systems is provided. Transmit channels transmit distinct chirp signals in an overlapped fashion such that the pulse repetition interval is kept short and the frame is kept short. This alleviates range migration and aids in achieving a high frame update rate. The chirp signals from differing transmitters can be separated on receive in the range spectrum domain, such that a MIMO virtual array construction is possible. Distinct chirps are delayed versions of the first chirp signal. Chirps overlap in the fast-time domain, but due to delay, there is separation in the range spectrum domain. When the delay is at least the instrument round-trip delay, transmitters are separable. Further, the wavelengths are identical across transmitters such that there is no residual-range versus angle ambiguity issue present in the claimed frequency-offset modulation range division MIMO system.

16 Claims, 13 Drawing Sheets

(51) Int. Cl.
*G01S 13/58* (2006.01)
*G01S 13/02* (2006.01)

(58) Field of Classification Search
CPC ...... G01S 13/582; G01S 13/347; G01S 7/023; G01S 7/352; G01S 7/282; G01S 7/0234; G01S 7/0232; G01S 7/0233; G01S 7/354
USPC ....... 342/107, 202, 128, 130, 132, 134, 175, 342/200, 201
See application file for complete search history.

(56) References Cited

U.S. PATENT DOCUMENTS

| | | | | |
|---|---|---|---|---|
| 5,455,588 | A * | 10/1995 | Lew | G01S 17/06 342/104 |
| 5,481,268 | A * | 1/1996 | Higgins | G01S 7/35 342/111 |
| 5,731,784 | A * | 3/1998 | Barron | G01S 7/282 342/36 |
| 7,151,483 | B2 * | 12/2006 | Dizaji | G01S 13/284 342/134 |
| 8,077,076 | B2 * | 12/2011 | Walter | G01S 13/345 342/128 |
| 9,448,302 | B2 | 9/2016 | Schoor et al. | |
| 9,541,638 | B2 | 1/2017 | Jansen et al. | |
| 9,557,412 | B2 * | 1/2017 | Hilsebecher | G01S 7/352 |
| 9,647,648 | B2 * | 5/2017 | Iwai | G01S 7/4021 |
| 9,762,088 | B2 * | 9/2017 | Homma | H05B 6/74 |
| 10,234,540 | B2 * | 3/2019 | Kim | G01S 13/87 |
| 11,199,617 | B2 * | 12/2021 | Hakobyan | G01S 13/931 |
| 11,360,202 | B2 * | 6/2022 | Mayer | G01S 13/4454 |
| 11,428,796 | B2 * | 8/2022 | Nam | G01S 13/536 |
| 2002/0175859 | A1 * | 11/2002 | Newberg | H01Q 3/2682 342/375 |
| 2005/0242985 | A1 * | 11/2005 | Ponsford | G01S 13/284 342/107 |
| 2009/0303108 | A1 * | 12/2009 | Hilsebecher | G01S 13/345 342/157 |
| 2009/0315761 | A1 * | 12/2009 | Walter | G01S 13/931 342/200 |
| 2015/0229301 | A1 * | 8/2015 | Iwai | G01S 7/354 327/306 |
| 2016/0223645 | A1 * | 8/2016 | Kim | G01S 13/87 |
| 2019/0056478 | A1 * | 2/2019 | Millar | H04B 1/69 |
| 2019/0204413 | A1 | 7/2019 | Jaeger et al. | |
| 2019/0265346 | A1 * | 8/2019 | Hakobyan | G01S 13/343 |
| 2020/0049812 | A1 * | 2/2020 | Jansen | G01S 13/4454 |
| 2020/0103515 | A1 * | 4/2020 | Kishigami | G01S 13/343 |
| 2020/0158861 | A1 * | 5/2020 | Cattle | G01S 13/89 |
| 2020/0233076 | A1 | 7/2020 | Chen et al. | |
| 2020/0309939 | A1 | 10/2020 | Subburaj et al. | |
| 2020/0363520 | A1 * | 11/2020 | Mayer | G01S 13/343 |
| 2021/0173042 | A1 | 6/2021 | Wu et al. | |
| 2021/0173069 | A1 | 6/2021 | Wu et al. | |
| 2021/0270951 | A1 * | 9/2021 | Yoshizawa | G01S 13/931 |

OTHER PUBLICATIONS

Lin, Qian-Qiang et al., "A New Dechirp Method for Wideband Radar Direct IF Sampling Signal", Proceedings of the 11th International Conference on Signal Processing, Oct. 21, 2012, pp. 1920-1924, IEEE, Piscataway, NJ, USA.

A. Ghaffari, E. A. M. Klumperink and B. Nauta, "Tunable N-Path Notch Filters for Blocker Suppression: Modeling and Verification," in IEEE Journal of Solid-State Circuits, vol. 48, No. 6, pp. 1370-1382, Jun. 2013, doi: 10.1109/JSSC.2013.2252521.

J. Fink and F. K. Jondral, "Comparison of OFDM radar and chirp sequence radar," 2015 16th International Radar Symposium (IRS), Dresden, 2015, pp. 315-320, doi: 10.1109/IRS.2015.7226369.

\* cited by examiner

US 11,796,632 B2

FREQUENCY AND TIME OFFSET MODULATION CHIRP MIMO RADAR

BACKGROUND

Field

This disclosure relates generally to radar systems and associated methods of operation, and more specifically, to a frequency and time offset modulation approach to radar systems to provide a very large multiple-input, multiple-output (MIMO) array formation.

Related Art

Radar systems are used to detect the range, velocity, and angle of nearby targets. With advances in technology, radar systems can now be applied in many different applications, such as automotive radar safety systems, but not every radar system is suitable for every application. For example, 77 GHz Frequency Modulation Continuous Wave (FMCW) Fast Chirp Modulation (FCM) radars are used with MIMO arrays as sensors in Advanced Driver Assistance System (ADAS) and autonomous driving (AD) systems. Since the number of virtual antennas constructed with the MIMO approach (which equals the product of the number of physical transmit and receiver antenna elements) is larger than the total number of physical elements, the resulting MIMO array can form a larger aperture than the physical elements alone, resulting in improved angular resolution. However, MIMO systems can have difficulty distinguishing between Linear Frequency Modulation (LFM) waveforms transmitted by different transmit antennas.

Existing radar systems have attempted to address these challenges by using time-division (TD) multiplexing techniques to separate LFM waveforms from different transmitters in time, thereby separating signals originated from distinct transmitters at each receiving channel for constructing a virtual MIMO array. But TD-MIMO systems are typically confined to using a small number of transmitters (e.g., three) to construct a relatively small MIMO virtual array. Thus, existing radar system solutions are extremely difficult at a practical level due to challenges with achieving the performance benefits of larger size radars within the performance, design, complexity and cost constraints of existing radar system applications.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments provide a radar system utilizing a linear chirp that can achieve a larger MIMO virtual array than traditional systems. To do so, transmit channels transmit distinct chirp signals in an overlapped fashion such that the pulse repetition interval is kept short and the frame, in turn, is kept short. This alleviates range migration and aids in achieving a high frame update rate. The chirp signals from differing transmitters can be separated on receive in the range spectrum domain, such that a MIMO virtual array construction is possible. Distinct chirps are delayed versions of the first chirp signal. The delays are small, so chirps overlap in the fast-time domain. But due to delay, there is separation in the range spectrum domain. When the delay is at least the instrument round-trip delay, transmitters are separable. Further, because the chirps sweep the same frequency range, the wavelengths are identical across transmitters such that there is no residual-range versus angle ambiguity issue present in the claimed frequency-offset modulation range division MIMO system.

In the context of the present disclosure, it will be appreciated that radar systems may be used as sensors in a variety of different applications, including but not limited to automotive radar sensors for road safety systems, such as advanced driver-assistance systems (ADAS) and autonomous driving (AD) systems. In such applications, the radar systems are used to measure radial distance to a reflecting object, its relative radial velocity, and angle information, and are characterized by performance criteria, such as the angular resolution (the minimum distance between two equal large targets at the same range and range rate (or radial velocity) resolution cell which a radar is able to distinguish and separate to each other), sensitivity, false detection rate, and the like. Typically, frequency modulated continuous wave (FMCW) modulation radars are used to identify the distance, velocity, and/or angle of a radar target, such as a car or pedestrian, by transmitting Linear Frequency Modulation (LFM) waveforms from multiple transmit antennas so that reflected signals from the radar target are received at multiple receive antennas and processed to determine the radial distance, relative radial velocity, and angle (or direction) for the radar target. However, with current automotive designs, a vehicle can include multiple radar transmitters that operate independently from one another. As a result, the LFM waveform transceivers may be configured to implement time-division (TD) MIMO operations to temporally separate signals originated from distinct transmitters so that a receiving channel can distinctly detect each signal and thereby construct a virtual MIMO array.

Figure 1:
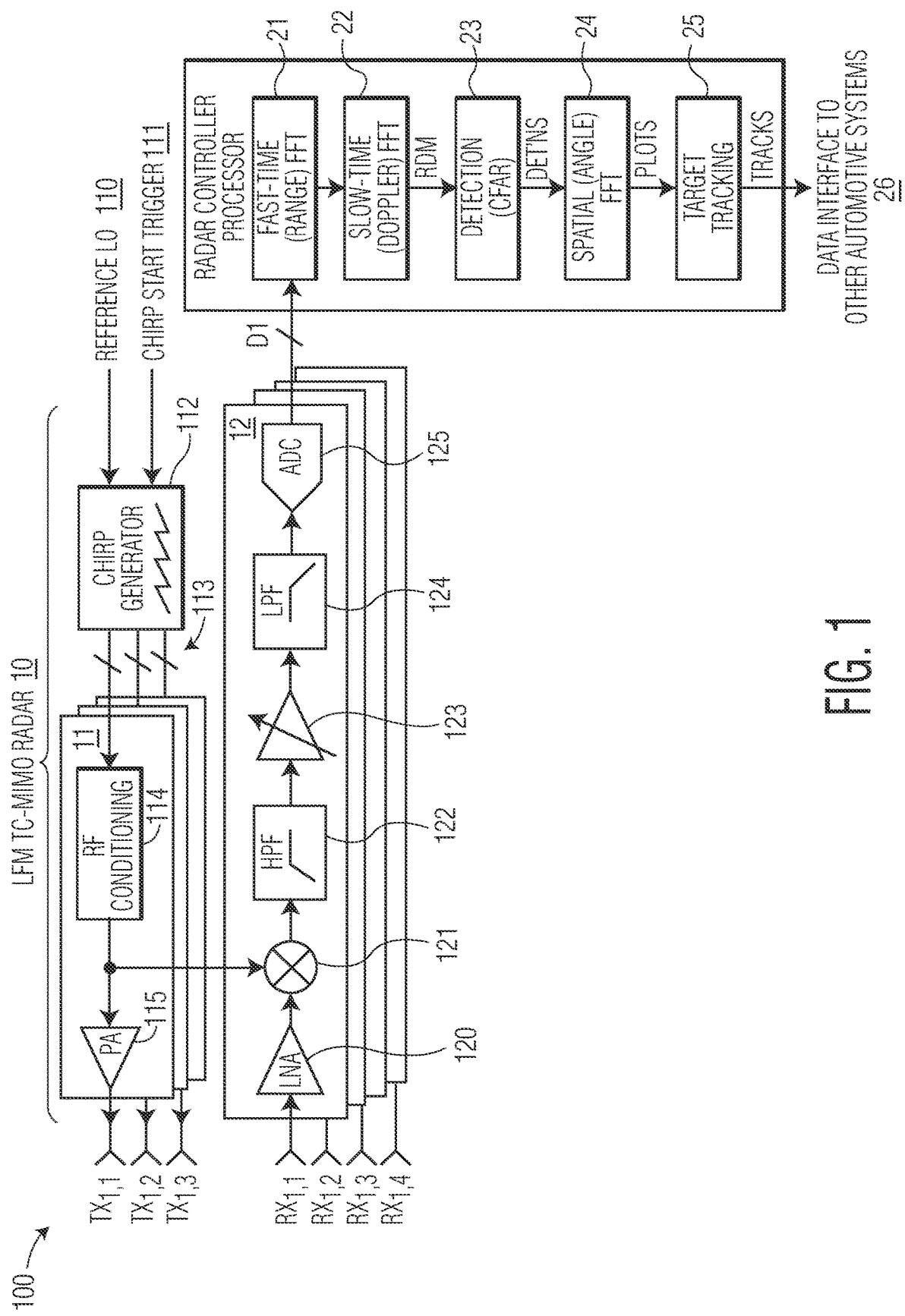
FIG. 1 which depicts a simplified schematic block diagram of a conventional LFM TD-MIMO automotive radar system which includes an LFM TD-MIMO radar device connected to a radar controller processor.

To illustrate the design and operation of a conventional TD MIMO radar system, reference is now made to FIG. 1 which depicts a simplified schematic block diagram of a conventional LFM TD-MIMO automotive radar system 100 which includes an LFM TD-MIMO radar device 10 connected to a radar controller processor 20. In selected embodiments, the LFM TD-MIMO radar device 10 may be embodied as a line-replaceable unit (LRU) or modular component that is designed to be replaced quickly at an operating location. Similarly, the radar controller processor 20 may be embodied as a line-replaceable unit (LRU) or modular component. Although a single or mono-static LFM TD-MIMO radar device 10 is shown, it will be appreciated that additional distributed radar devices may be used to form a distributed or multi-static radar. In addition, the depicted radar system 100 may be implemented in integrated circuit form with the LFM TD-MIMO radar device 10 and the radar controller processor 20 formed with separate integrated circuits (chips) or with a single chip, depending on the application.

Each radar device 10 includes one or more transmitting antenna elements $TX_i$ and receiving antenna elements $RX_j$ connected, respectively, to one or more radio-frequency (RF) transmitter (TX) units 11 and receiver (RX) units 12. For example, each radar device (e.g., 10) is shown as including individual antenna elements (e.g., $TX_{1,i}$, $RX_{1,j}$) connected, respectively, to three transmitter modules (e.g., 11) and four receiver modules (e.g., 12), but these numbers are not limiting and other numbers are also possible, such as four transmitter modules 11 and six receiver modules 12, or a single transmitter module 11 and/or a single receiver modules 12. Each radar device 10 also includes a chirp generator 112 which is configured and connected to supply a chirp input signal to the transmitter modules 11. To this end, the chirp generator 112 is connected to receive a separate and independent local oscillator (LO) signal 110 and a chirp start trigger signal 111, though delays are likely to be different due to the signal path differences and programmable digital delay elements in the signal paths. Chirp signals 113 are generated and transmitted to multiple transmitters 11, usually following a pre-defined transmission schedule, where they are filtered at the RF conditioning module 114 and amplified at the power amplifier 115 before being fed to the corresponding transmit antenna $TX_{1,i}$ and radiated. By sequentially using each transmit antenna $TX_{1,i}$ to transmit successive pulses in the chirp signal 113, each transmitter element 11 operates in a time-multiplexed fashion in relation to other transmitter elements because they are programmed to transmit identical waveforms on a temporally separated schedule.

The radar signal transmitted by the transmitter antenna unit $TX_{1,i}$, $TX_{2,i}$ may be reflected by an object, and part of the reflected radar signal reaches the receiver antenna units $RX_{1,i}$ at the radar device 10. At each receiver module 12, the received (radio frequency) antenna signal is amplified by a low noise amplifier (LNA) 120 and then fed to a mixer 121 where it is mixed with the transmitted chirp signal generated by the RF conditioning unit 113. The resulting intermediate frequency signal is fed to a first high-pass filter (HPF) 122. The resulting filtered signal is fed to a first variable gain amplifier 123 which amplifies the signal before feeding it to a first low pass filter (LPF) 124. This re-filtered signal is fed to an analog/digital converter (ADC) 125 and is output by each receiver module 12 as a digital signal D1. The receiver module compresses target echo of various delays into multiple sinusoidal tones whose frequencies correspond to the round-trip delay of the echo.

The radar system 100 also includes a radar controller processing unit 20 that is connected to supply input control signals to the radar device 10 and to receive therefrom digital output signals generated by the receiver modules 12. In selected embodiments, the radar controller processing unit 20 may be embodied as a micro-controller unit (MCU) or other processing unit that is configured and arranged for signal processing tasks such as, but not limited to, target identification, computation of target distance, target velocity, and target direction, and generating control signals. The radar controller processing unit 20 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar controller processor 20 may be configured to program the modules 11 to operate in a time-division fashion by sequentially transmitting LFM chirps for coordinated communication between the transmit antennas $TX_{1,i}$, $RX_{1,j}$. The result of the digital processing at the radar controller processing unit 20 is that the digital domain signals D1 are processed for the subsequent fast-time range FFT 21, slow-time Doppler FFT 22, constant false alarm rate (CFAR) target detection 23, spatial angle estimation 24, and target tracking processes 25, with the result being output 26 to other automotive computing or user interfacing devices for further process or display.

Figure 2:
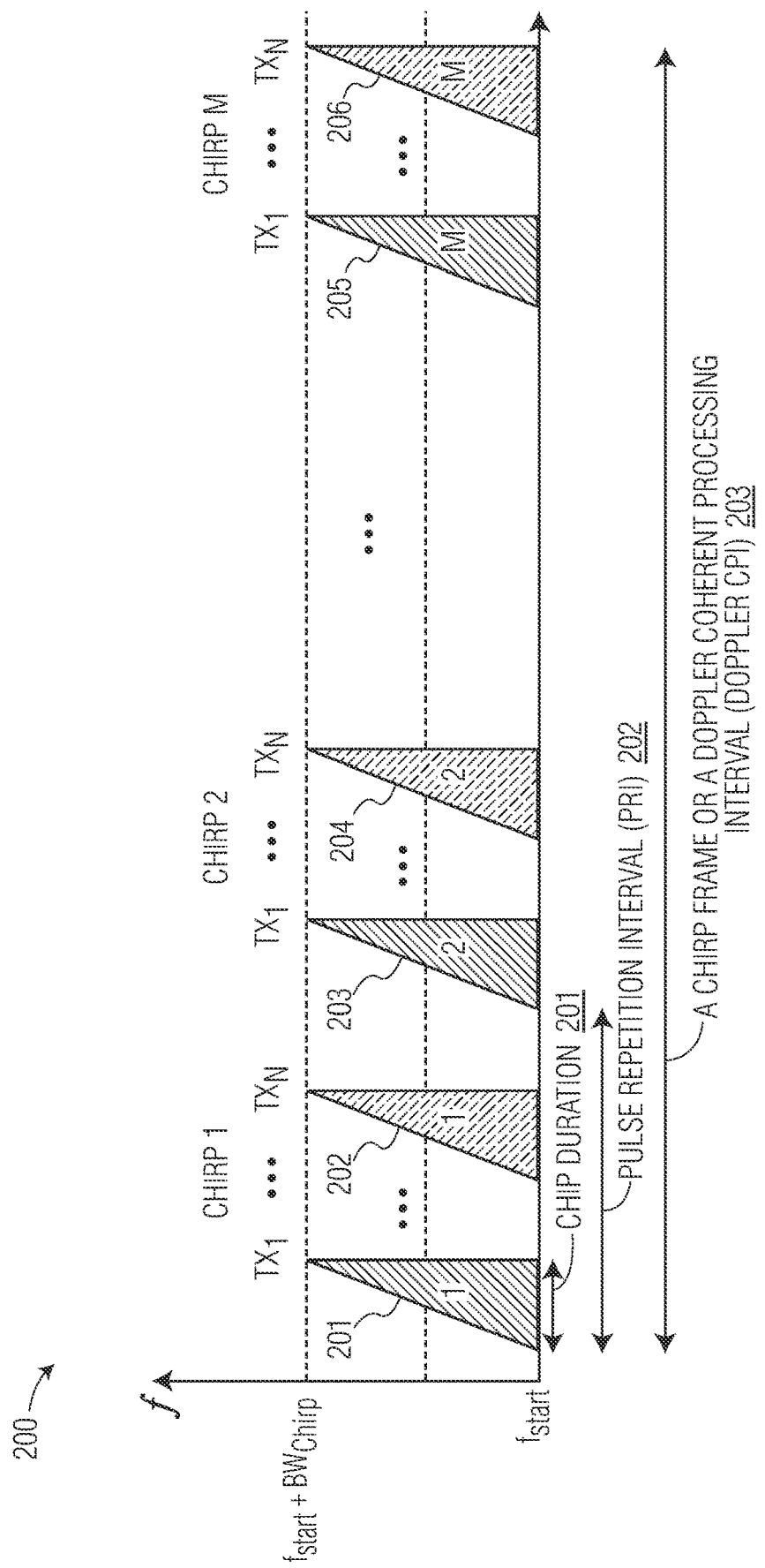
FIG. 2 which depicts a timing diagram illustration of a chirp transmission schedule for an LFM TD-MIMO automotive radar system.

To illustrate an example of time division transmission of radar transmit signals, reference is now made to FIG. 2 which depicts a timing diagram illustration 200 of a chirp transmission schedule for an LFM TD-MIMO automotive radar system. As depicted, each transmitter (e.g., $TX_1$, etc.) is programed to take turns transmitting one chirp (e.g., 201) of a sequence of chirps 201-206. This temporal separation of chirp transmission by each transmit antenna allows the separation of transmitters at the receiving end by simply associating the received signal with the scheduled transmitter. The ability to separate transmitters in the received signal is a prerequisite of the MIMO radar approach, which is routinely used in automotive radars for constructing a virtually large antenna array aperture compared to the physical aperture of the transmit and receive antennas. The larger aperture constructed virtually via MIMO provides better angular resolution performance which is required by many advanced driver assistance system (ADAS) and autonomous driving (AD) applications. The use of a transmitter schedule to divide the time-domain resources amongst the transmitters when forming a virtual MIMO array is referred to as a time division (TD) MIMO approach.

Since the TD-MIMO approach provides a relatively straightforward way to separate transmitters with little or no leakage, it is routinely used in automotive radar applications. However, the requirement of dividing time between resources means that a much longer frame duration is required to complete the transmission of all chirps for each transmitter. If the prolonged frame duration is longer than the duration a target stays within a single range resolution cell, any range migration by the target can degrade the subsequent digital Doppler coherent integration processing and angle estimation, thereby adversely impacting measurement performance.

Another drawback with conventional TD-MIMO approaches is the increase in the duration of the pulse repetition intervals (PRI) between adjacent pulses of the same transmitter. In particular, with each transmitter (e.g., $TX_1$-$TX_N$) being scheduled to take its turn to transmit their first pulses (e.g., 201-202) before beginning the sequential transmission of the second pulses (e.g., 203-204), and so on until the last pulses (e.g., 205-206) are transmitted, the pulse repetition interval (PRI) 202 between two adjacent pulses of the same transmitter is also prolonged. Because the maximum unambiguous Doppler shift measurable by the chirp sequence is inversely related to the PRI, a lengthened PRI results in reduced maximum unambiguous Doppler performance. As a result, the maximum number of transmitters that can be used for TD-MIMO operation is limited. For typical road use, up to 3 transmitters may be used for TD MIMO without unacceptable performance degradation. This, in turn limits the size of the MIMO virtual array.

Embodiments of the present invention overcome the limitations of traditional TD-MIMO approaches by introducing a new frequency and time offset modulation (FanTOM) approach to the Linear Frequency Modulation (LFM) automotive radar. This enables larger MIMO array constructions than those traditionally available. One aspect of the FanTOM approach is a frequency and time offset modulation chirp waveform that enables signals transmitted from distinct transmitters to be separable in a range spectrum at each receive channel. The degree of range separation corresponds to the amount of time offset imposed on each transmitter. The time offset nominally should be at least the amount of the maximum round-trip target delay observable by the system (e.g., 2 µs in typical automotive applications). A corresponding frequency offset is applied to each transmit channel such that all chirps are transmitted with an identical start frequency and identical stop frequency. The effect of the frequency and time offset is equivalent to transmitting distinctly delayed chirps at different transmit channels.

During reception, each receive channel mixes the received RF signal with a reference chirp that starts with the first chirp of the group and ends when the echo from the last chirp of the group arrives at the receiver's (e.g., 2 µs after the end of transmission of the last chirp of the group). In one example embodiment, as will be discussed in greater detail below, the starting frequency of the reference chirp is the same as the start frequency of the first chirp and the slope of the reference chirp is the same as that of all the chirps. Each receive channel uses the same reference chirp for mixing purposes.

Each receive channel starts digital acquisition beginning at the start of the earliest chirp transmission and ends when an echo from the last chirp of every transmitter arrives at the receivers (e.g., 2 µs after completion of the transmission of the last chirp of the group). The speed of an ADC associated with the receivers should be sufficiently fast to describe unambiguously the IF frequency of the most distant targets echoed from the last chirp. As an example, for a most distant target at a range Rmax [m] illuminated by a linear chirp with a slope of S [MHz/s] transmitted by K transmitters in the FanTOM fashion, the maximum IF frequency to be described will be $$IF\,\text{max} = K*S*(R\,\text{max}*2)/c = K*S*\Delta t = K*\Delta f \text{ [MHz]},$$

where c is the speed of light [m/s] and the sampling rate of the ADC (Fs) is at least twice IFmax. In practice, the sampling rate should be significantly greater than 2*IFmax in order to allow pre-ADC analog anti-alias filtering and post-ADC digital filtering. In turn, (Rmax*2)/c=$\Delta t$ and S*$\Delta t$=$\Delta f$, where $\Delta t$ is the offset time between transmit channels (e.g., when the power amplifier associated with each transmit channel is in an ON state), and is the amount of frequency offset between transmit channels. Thus, for up-chirps, the frequency offset is -$\Delta f$, while for down-chirps, the frequency offset is $\Delta f$.

Figure 3:
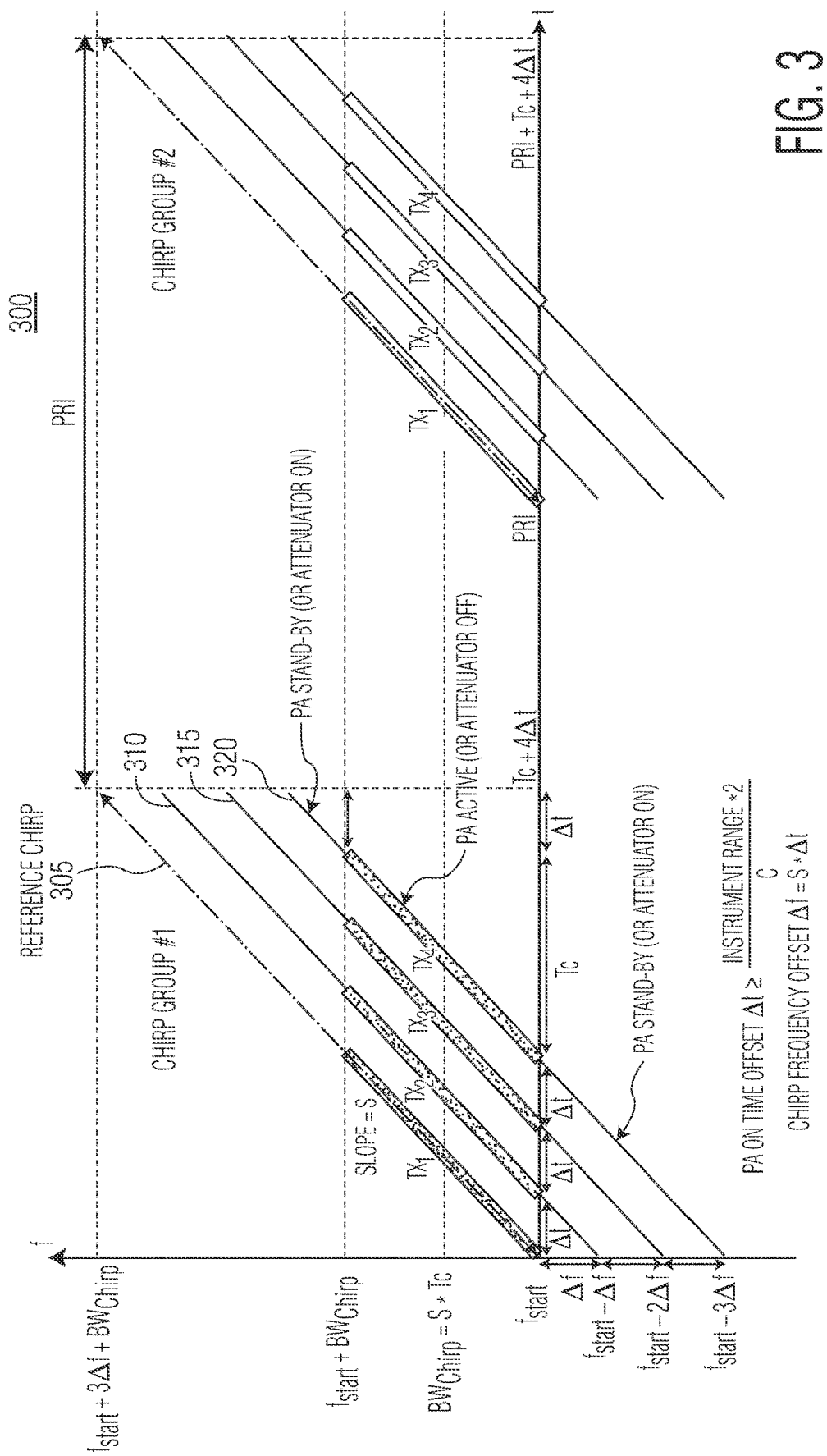
FIG. 3 is a graph illustrating a frequency plan of an exemplary four-transmit channel FanTOM chirp system, in accordance with embodiments of the present invention.

FIG. 3 is a graph illustrating a frequency plan 300 of an exemplary four-transmit channel FanTOM chirp system, in accordance with embodiments of the present invention. A reference chirp 305 begins at a time (t) equal to zero and ends at a time Tc+4$\Delta t$. The reference chirp starts at a frequency (f) $f_{start}$ and ends at a frequency $f_{start}$+$BW_{chirp}$+ 3$\Delta f$, where $BW_{chirp}$ is the chirp bandwidth and $BW_{chirp}$=S*Tc, wherein Tc is the chirp transmit duration.

Figure 4:
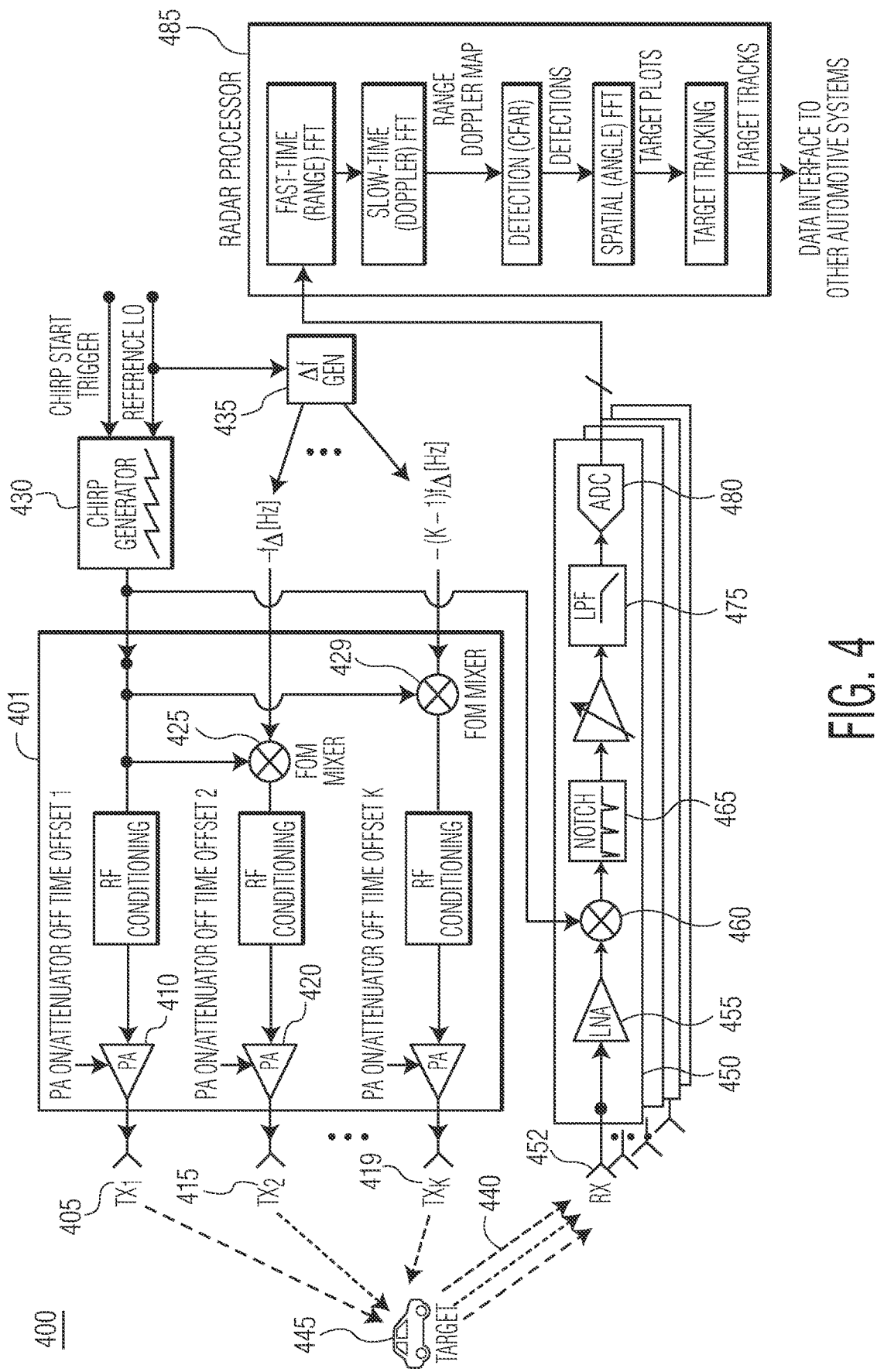
FIG. 4 is a simplified block diagram illustrating an example of a functional block diagram of a transceiver subsystem associated with a FanTOM chirp radar system, in accordance with embodiments of the present invention

FIG. 4 is a simplified block diagram illustrating an example of a functional block diagram of a transceiver subsystem 400 associated with a FanTOM chirp radar system, in accordance with embodiments of the present invention. A transmitter $TX_1$ 405, of one or more transmitters 401, is excited with reference chirp 305, generated by chirp generator 430, but only transmits the chirp for a duration of Tc starting from time zero, which is relative to the start of a frame. The transmit duration can be controlled by switching a power amplifier (PA 410) from and to a standby mode. Transmitter $TX_2$ 415 is excited by a frequency offset version of the reference chirp 310. The amount of frequency offset is -$\Delta f$, as illustrated in FIG. 3. The on time of $TX_2$ 415's power amplifier 420 is similarly offset by an amount of $\Delta t$ and remains on for Tc. The offset frequency is controlled by an offset frequency generator 435, such that $\Delta f$=S*$\Delta t$, where S is the slope of the linear chirp. The combined effect of $\Delta f$ and $\Delta t$ is that the chirp transmitted by $TX_2$ 415 is a delayed version of the transmitted chirp by $TX_1$ 405, as illustrated in FIG. 3. The PA 420 ON offset $\Delta t$ is at least the amount of round-trip delay equivalent to the desired range of the radar system.

In practice, the power amplifier ON/OFF function controls the radiation time of the signal. This can be achieved, for example, by an RF switch circuit connecting the input signal to an active power amplifier. By closing the RF switch circuit, the signal is input to the active power amplifier, which then outputs an amplified signal for radiation by an antenna. By opening the RF switch circuit, no signal is input to the active power amplifier and an amplified signal is not amplified nor radiated. As an alternative example, an RF switch circuit can connect the output of the power amplifier to the input of an antenna. When the RF switch circuit is closed, an amplified signal from the power amplifier is provided to the antenna for radiation. When the RF switch circuit is open, the amplified signal is not radiated by the antenna.

In a similar fashion, a third transmitter $TX_3$ transmits a signal 315 that is a version of TX1's chirp delayed by $2\Delta t$. This can be achieved by applying a frequency offset of $2\Delta f$ to the reference chirp and an ON offset of $2\Delta t$ to the power amplifier for $TX_3$, and remaining in an ON state for a duration of Tc. Likewise, a fourth transmitter $TX_4$ transmits a signal 320 that is a version of $TX_1$'s chirp delayed by $3\Delta t$ following a similar procedure. This group of chirps are repeatedly transmitted at a pulse repetition interval (PRI) duration for M times until the end of the frame.

During the receive process, each receiver 450 mixes a RF signal 440 received at an antenna 452 returned from a target 445 with the reference chirp 305 (e.g., at mixer 460), and then the mixed signal is conditioned with zero-range notch filtering 465 and anti-aliasing filtering 475 for a continuous time filter, or if an n-path filter is used to implemented the notch filter then the anti-alias filter is placed before the notch filter or an additional low-pass filter is added prior to the notch filter in the receive signal processing path. The filtered signal is sampled by an analog-to-digital converter (ADC) 480 for the entire duration from chirp start (e.g., t=0 for the first group, and t=(m−1)*PRI for group m) and continuing for a duration of no less than Tc+4$\Delta$t. The ADC should provide at least Ns samples, where Ns=ceil{(Tc+4$\Delta$t)*Fs} and Fs is the ADC sampling rate and ceil{.} is a round-up operation. In the four-transmit channel example illustrated, the maximum IF frequency is 4$\Delta$f, resulting in a sampling rate of the ADC being at least twice the maximum IF frequency to meet the Nyquist criteria. In addition, in order to reduce the area (e.g., cost) and power of anti-alias filter 475, the ADC sample rate should be significantly higher than the Nyquist rate (e.g., at least four times the maximum IF frequency). The output of ADC 480 from each receive channel 450 is the raw data of the radar.

Figure 5:
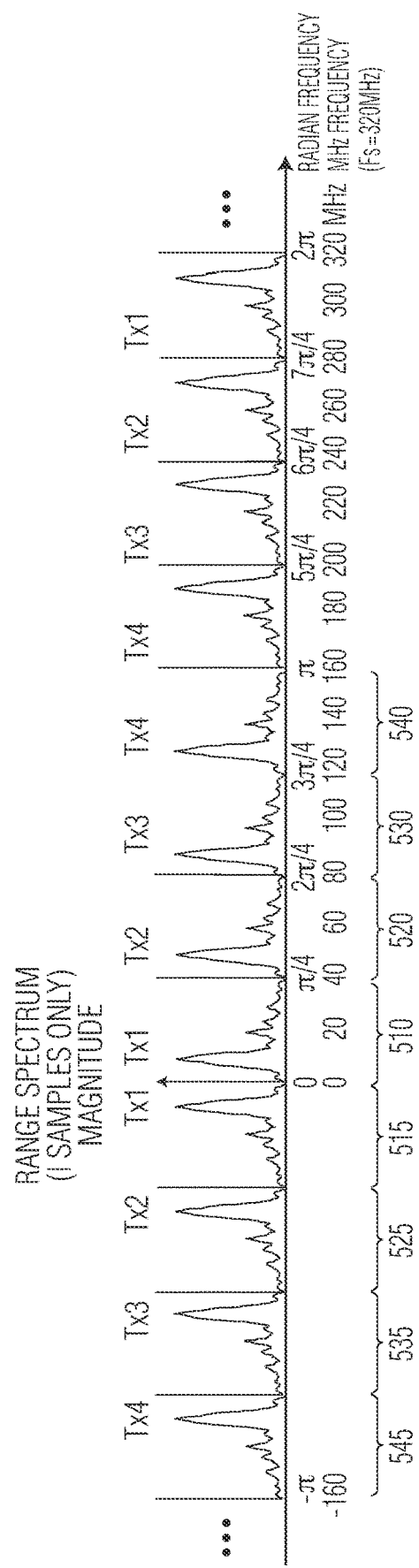
FIG. 5 is a diagram illustrating an example of the range spectrum of a receive channel of a four transmit channel FanTOM chirp system, where the individual range spectrum from different transmitters are separable in the range domain, or alternatively in the IF spectrum domain, in accordance with embodiments of the present invention.

Next the spectrum of the raw ADC samples are processed by radar processor 485 (e.g., using a fast Fourier transform engine) to extract the target range information. The radar processor can perform a variety of tasks in extracting the target range information. For example, extracting the range spectrum of each of the N transmitters from a range spectrum of the N radio frequency encoded transmit signals; forming a Doppler spectrum for each range spectrum (over multiple transmit cycles). Then performing detection of the target return signal in each Doppler spectrum transmitter/receiver pair. Forming a range-division MIMO virtual antenna measurement vector from the detected target return signals and, then, generating a target angle using the formed range-division MIMO virtual antenna measurement vectors FIG. 5 is a diagram illustrating an example of the range spectrum of a receive channel of a four-transmit channel FanTOM chirp system, where the individual range spectrum from different transmitters are separable in the range domain, or alternatively in the IF spectrum domain, in accordance with embodiments of the present invention. Due to the arrangement of the transmit chirps 305-320 from the transmitters, target echoes from individual transmitters will be distinctly situated on difference non-overlapping sections of the computed spectrum, with each occupying a $\Delta$f section on either side of zero frequency. For the above four transmit channel example, target echo from $TX_T$ appears in IF frequency sections between 0 and $\Delta$f (510) and 0 and $-\Delta$f (515); target echo from $TX_2$ appears in IF frequency sections between $\Delta$f and 2$\Delta$f (520) and $-\Delta$f and $-2\Delta$f (525); target echo from $TX_3$ appears in IF frequency sections between 2$\Delta$f and 3$\Delta$f (530) and $-2\Delta$f and $-3\Delta$f (535); and target echo from $TX_4$ appears in IF frequency sections between 3$\Delta$f and 4$\Delta$f (540) and $-3\Delta$f and $-4\Delta$f (545). For a real ADC sample spectrum, the negative portion of the spectrum can be neglected.

As long as $\Delta$t and $\Delta$f are sufficiently large, the target echoes from different illuminators or transmit channels will not overlap, and therefore can be unambiguously separated. If the range spectrums were to overlap, then additional disambiguation processing would be needed. Repeat the range spectrum separation for each of the N receive channels and upon completion, one may obtain a total of N*K virtual receive antenna channels, where K=4 in the prior example. This is how the MIMO virtual array can be constructed from the FanTOM chirp. The transmitters are divided up in the range domain, so it is a form of Range-Division (RD) MIMO.

Returning to FIG. 4, a reference chirp generator 420 generates the reference chirp for the transmit channels (e.g., 405, 415, and 419). In each transmit channel, an appropriate frequency offset is applied utilizing a frequency offset mixer (FOM) (e.g., 425 and 429) associated with the transmit channel, and an appropriate power amplifier (PA) (e.g., 410) ON time offset is engaged to transmit correctly delayed chirps from the individual transmit channels.

As discussed above, during reception of reflected signals, the received RF signal is filtered (e.g., using low noise amplifier 455) and mixed with the reference chirp (e.g., at mixer 460) to extract the IF signals. The IF signals are then notch filtered (465) to remove zero-range components which are likely due to Tx-to-Rx spillover before being sampled by the associated ADC 480. The example receiver 452 provides notch filter 465 implemented as a continuous-time filter. In an alternative receiver, if the notch filter is implemented as an n-path filter (e.g., a sampled data filter), then the receiver path would provide a low-pass filter (e.g., 475) preceding the notch filter, rather than between the notch filter and the ADC.

ADC 480 passes a digitized IF signal to the signal processing chain in radar processor 485. An example signal processing chain can include range spectrum analysis, Doppler spectrum analysis, followed by detection and angle estimation, and then target tracking. The output of the radar processor 485 can be fed to other vehicular control and processing systems via a data interface and networking systems (not shown).

In an alternative to notch filter circuit 465 for removing Tx-to-Rx spillover, a direct cancellation of the coupled-in Tx signal can be performed if the spillover amplitude and phase are known. The spillover signal amplitude and phase can be measured directly by controlling the Rx amplification such that no saturation of an ADC occurs and then observing a zero-range frequency component of the spectrum of the sampled IF signal. The observed zero-range peak phase and amplitude, with the known gain and attenuation compensated back to recover the correct magnitude, can be used for constructing a cancellation signal (e.g., using a digital synthesizer). The cancellation signal outputs a sinusoidal tone tuned to the zero-range IF frequency with comparable amplitude to the spillover and with opposite phase to the spillover. The cancellation signal then can be injected to the receiver signal chain such that the spillover can be suppressed.

Embodiments of the present system provide signal chirps that each start at the same frequency and end at the same frequency, thus, a central frequency is identical across all transmit channels resulting also in an identical wavelength across all the transmit channels. In light of this identical wavelength, any given radar target at an arbitrary range from the transmitting antennas will result in the same phase offset across each transmit channel. In light of this identical phase offset across the entire virtual antenna array, there is no angle estimation error.

Figure 6:
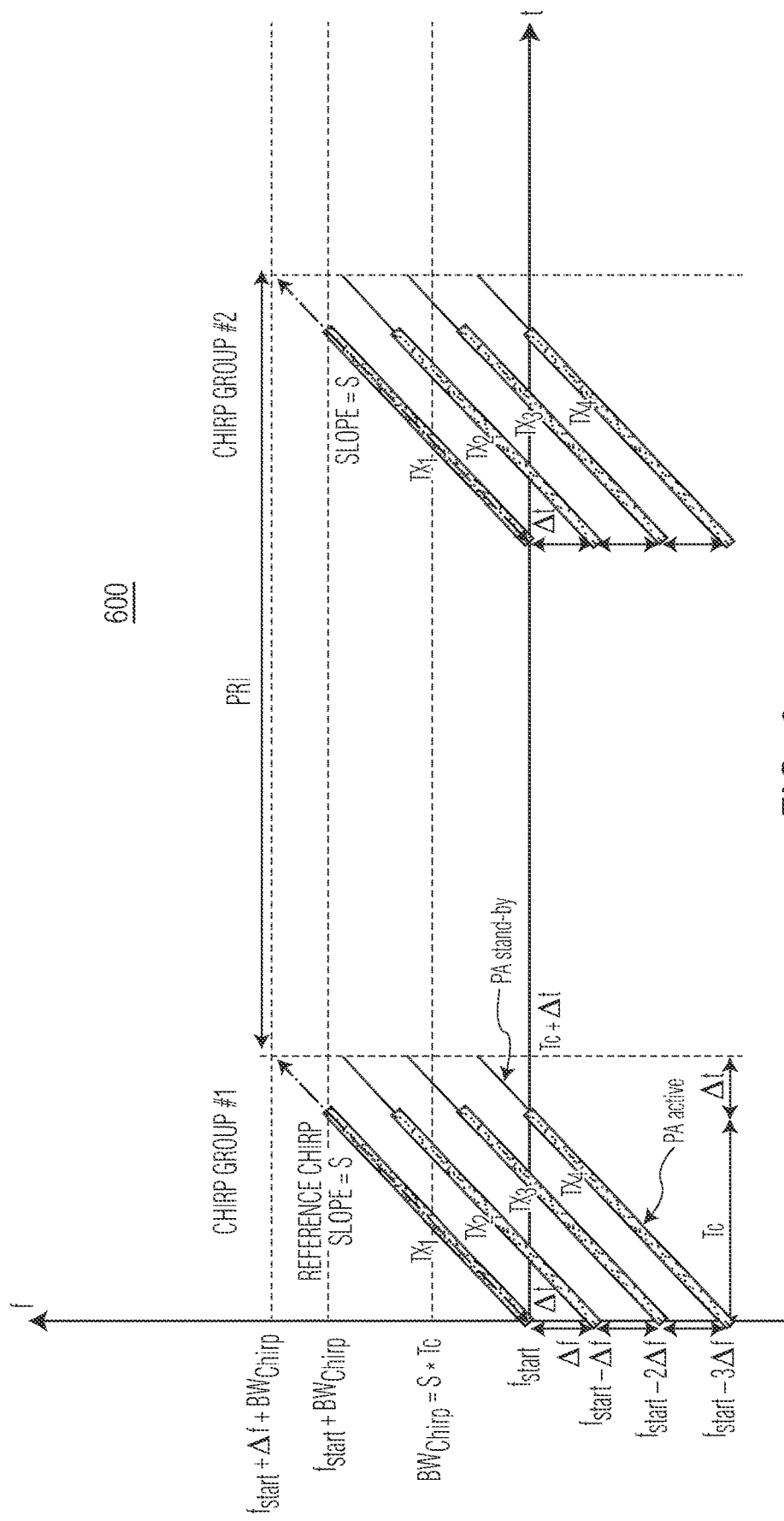
FIG. 6 is a simplified graph illustrating a frequency plan of an exemplary four-transmit channel frequency-offset modulation (FOM) range division (RD) MIMO chirp system.

FIG. 6 is a diagram illustrating a frequency plan 600 of an exemplary four-transmit channel frequency-offset modulation (FOM) range division (RD) MIMO chirp system. Conventional FOM RD MIMO systems have each transmit channel transmit chirp at a different central frequency simultaneously, resulting in differing wavelengths and consequently non-identical phase offsets due to the residual distance to the closest range cells center. These non-identical phase offsets, if not corrected, result in estimation bias and ambiguity in the angle processing output. Thus, additional processing is performed to mitigate the residual range angle ambiguity. Embodiments utilizing the FanTOM chirp eliminate the residual range versus angle ambiguity of traditional ROM RD MIMO systems.

Further, compared to traditional TD MIMO systems, in which chirp transmissions are well separated, the FanTOM chirp system permits overlapped transmissions. In certain examples, the time offset, Δt (~2 μs), is significantly shorter than the chirp transmit duration, Tc (on the order of tens of microseconds), and thus significant overlap is present. The small time offset allows a large number of transmit channels to be transmitted in the FanTOM fashion. As an example, for a Tc=30 μs and Δt=2 μs with K=12 (transmit channels), the chirp group duration (K*Δt+Tc) becomes 54 μs. If there is a 6 μs duration before the next chirp group, a pulse repetition interval (PRI) of 60 μs is realized. If a frame has M=256 chirp groups, the frame duration is 15.36 ms (256*60). This short frame duration is typically safe from range migration for typical automotive applications and can be supportive for a fast frame update. On the other hand, for TD MIMO to support 12 transmit channels, assuming the same 6 μs silent period, a minimum PRI of 432 μs (K*(Tc+6)=12*(30+6)) is obtained with a frame duration of 110.592 ms (256*432), which is prohibitively long and can result in a potentially severe range walk as well as a low frame rate.

The FanTOM chirp MIMO also compares favorably to other traditional radar systems. For example, with phase modulated continuous wave (PMCW) coded waveform radar systems, where the orthogonality between the phase codes degrades with a Doppler shift (e.g., the binary phases are no longer 180° apart due to the Doppler shift). In such systems, the MIMO virtual array construction is prone to leakage in that separation of the various transmitters signals cannot be performed due to loss of orthogonality. The present FanTOM-based MIMO does not suffer from Doppler degradation and orthogonality is maintained. Similarly, with orthogonal frequency division multiplexing (OFDM) radar systems, the orthogonality between the sub-carriers degrades with Doppler shift (e.g., the separation between subcarriers changes with differing Doppler making them non-orthogonal). In such systems, the MIMO virtual array construction is also prone to leakage in that separation of the transmitters signals cannot be performed due to loss of orthogonality. Again, the proposed FanTOM-based MIMO does not suffer from Doppler degradation and orthogonality is maintained regardless of the Doppler. In radar systems utilizing Doppler Division (DD) MIMO waveforms, targets are separated in the Doppler spectrum domain. But the FanTOM-based MIMO does not reduce the maximum unambiguous Doppler by multiple folds as performed by DD MIMO, and so the Doppler performance is not degraded.

Figure 7:
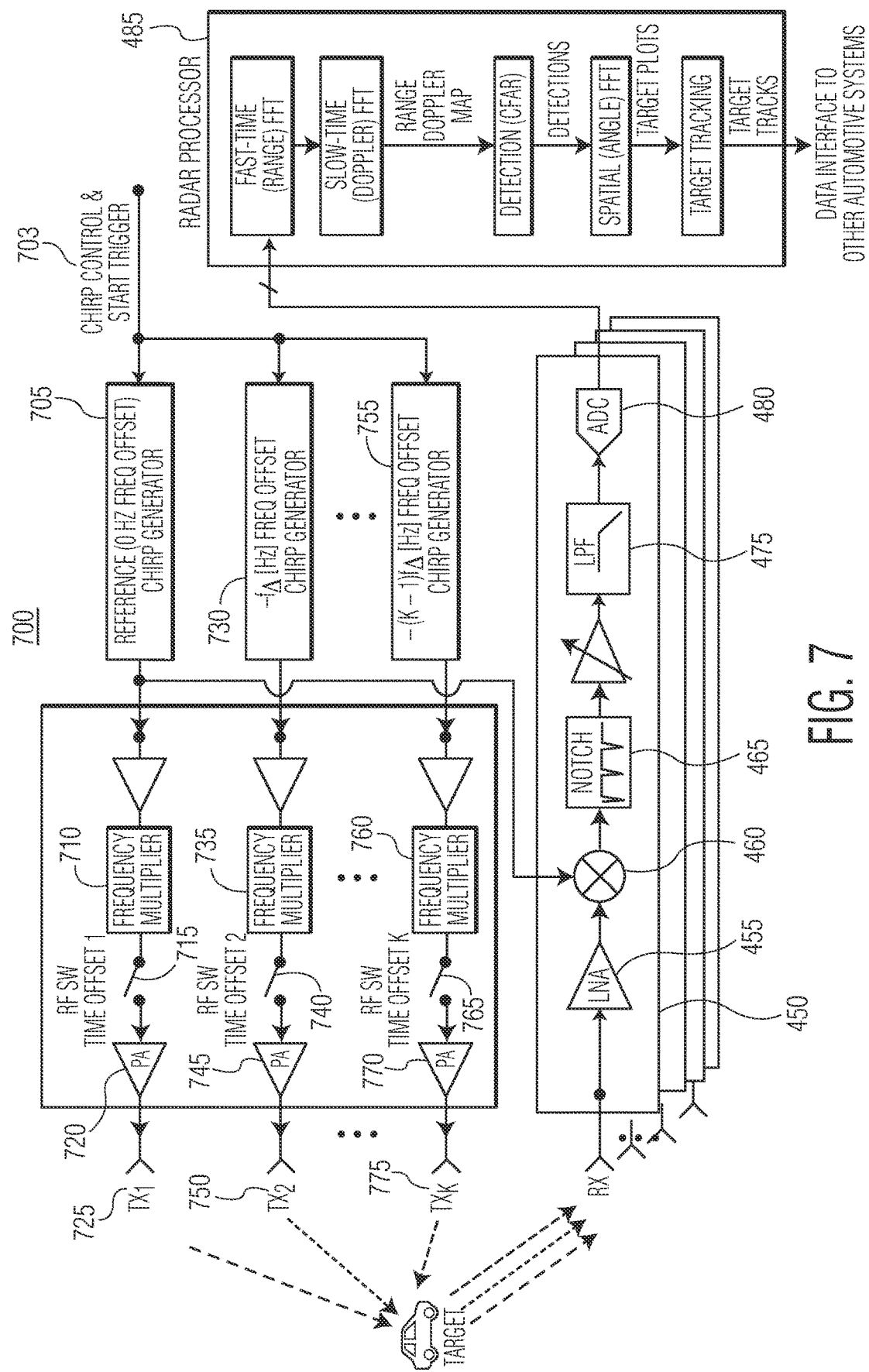
FIG. 7 is a simplified block diagram illustrating an alternate example of a functional block diagram of a transceiver subsystem associated with a FanTOM chirp radar system, in accordance with embodiments of the present invention.

FIG. 7 is a simplified block diagram illustrating a functional block diagram of an alternate example transceiver subsystem 700 associated with a FanTOM chirp radar system, in accordance with embodiments of the present invention. Transceiver subsystem 700 provides the frequency and time offsets of a FanTOM chirp utilizing a set of frequency offset chirp generators 705, 730, and 755 each triggered by a chirp control and start trigger 703. Each chirp generator is associated with a corresponding transmit path that includes a frequency multiplier (e.g., 710, 735, and 760) coupled to a power amplifier (e.g., 720, 745, and 770). Time offset of chirp transmission is provided using an RF switch that controls the provision of the frequency multiplied chirp to the power amplifier (e.g., 715, 740, and 765). Alternatively, if it is desirable to keep the power amplifiers powered up (depending upon the nature of the application), switches 715, 740, and 765 can be placed between the output of power amplifiers and their associated antenna circuitry (e.g., 725, 750, and 775). The receiver path of transceiver subsystem 700 is the same as that depicted for transceiver subsystem 400 with the reference chirp being provided to mixer 460 from reference chirp generator 705. It should be noted that the reference chirps can be provided in baseband or intermediate frequency. Further, frequency multiplication can be performed in one or multiple stages depending upon the nature the application.

Figure 8:
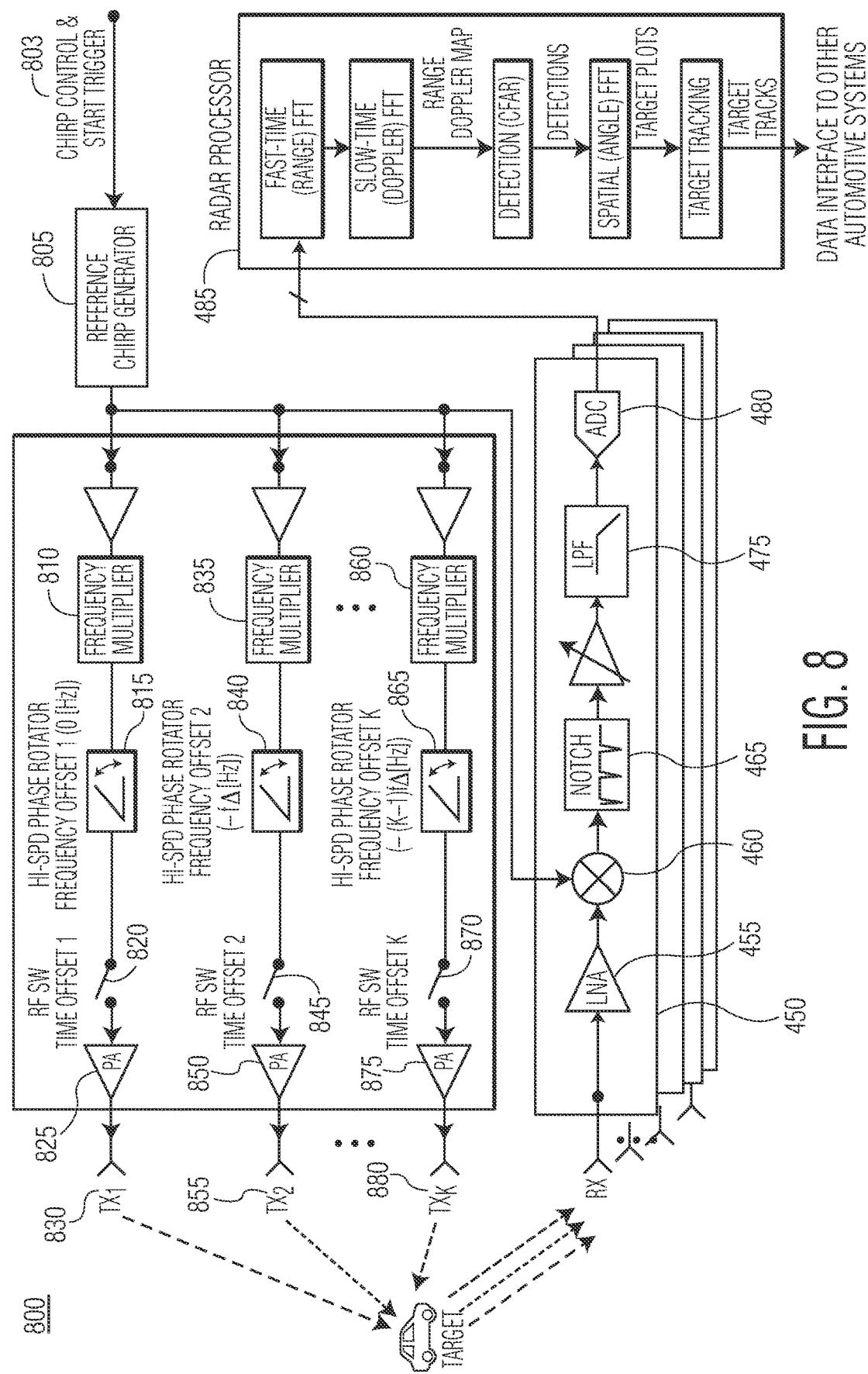
FIG. 8 is a simplified block diagram illustrating another alternate example of a functional block diagram of a transceiver subsystem associated with a FanTOM chirp radar system, in accordance with embodiments of the present invention.

FIG. 8 is a simplified block diagram illustrating a functional block diagram of another alternate example transceiver subsystem 800 associated with a FanTOM chirp radar system, in accordance with embodiments of the present invention. Transceiver subsystem 800 provides the frequency and time offsets of a FanTOM chirp utilizing a single reference chirp generator and providing frequency offsets using high-speed phase shifters along with time offsets utilizing RF switches. A chirp control and start trigger 803 is provided to a reference chirp generator 805. Reference chirp generator 805 provides the reference chirp to each transmitter path, which include a frequency multiplier (e.g., 810, 835, and 860) that is coupled to a corresponding high-speed phase shifter (e.g. 815, 840, and 865), which is in turn coupled to a corresponding power amplifier (e.g., 825, 850, and 875). In one example, high-speed phase shifter 815 would provide a frequency offset of zero for the first transmitter 830. In this example, high-speed phase shifter 840 would provide a frequency offset of $-f_A$ and high-speed a shifter 865 would provide a frequency offset of $-(K-1)f_A$. In a manner similar to that described above with regard to transceiver subsystem 700, time offset of chirp transmission is provided using RF switches that control the provision of the frequency multiplied chirp to a power amplifier in the transmit path (e.g., 820, 845, and 870). As with transceiver subsystem 700, if it is desirable to keep the power amplifiers powered up, in light of the nature the application, switches 820, 845, and 870 can be placed between the output of the corresponding power amplifier and the associated antenna circuitry (e.g., 830, 855, and 880). As with transceiver subsystem 700, the receiver path of transceiver subsystem 800 is the same as that depicted for transceiver subsystem 400, with the reference chirp being provided to mixer 460 from reference chirp generator 805. Again, the reference chirp can be provided in baseband or intermediate frequency. Further, frequency modification can be performed in one or multiple stages depending upon the nature of the application.

Figure 9:
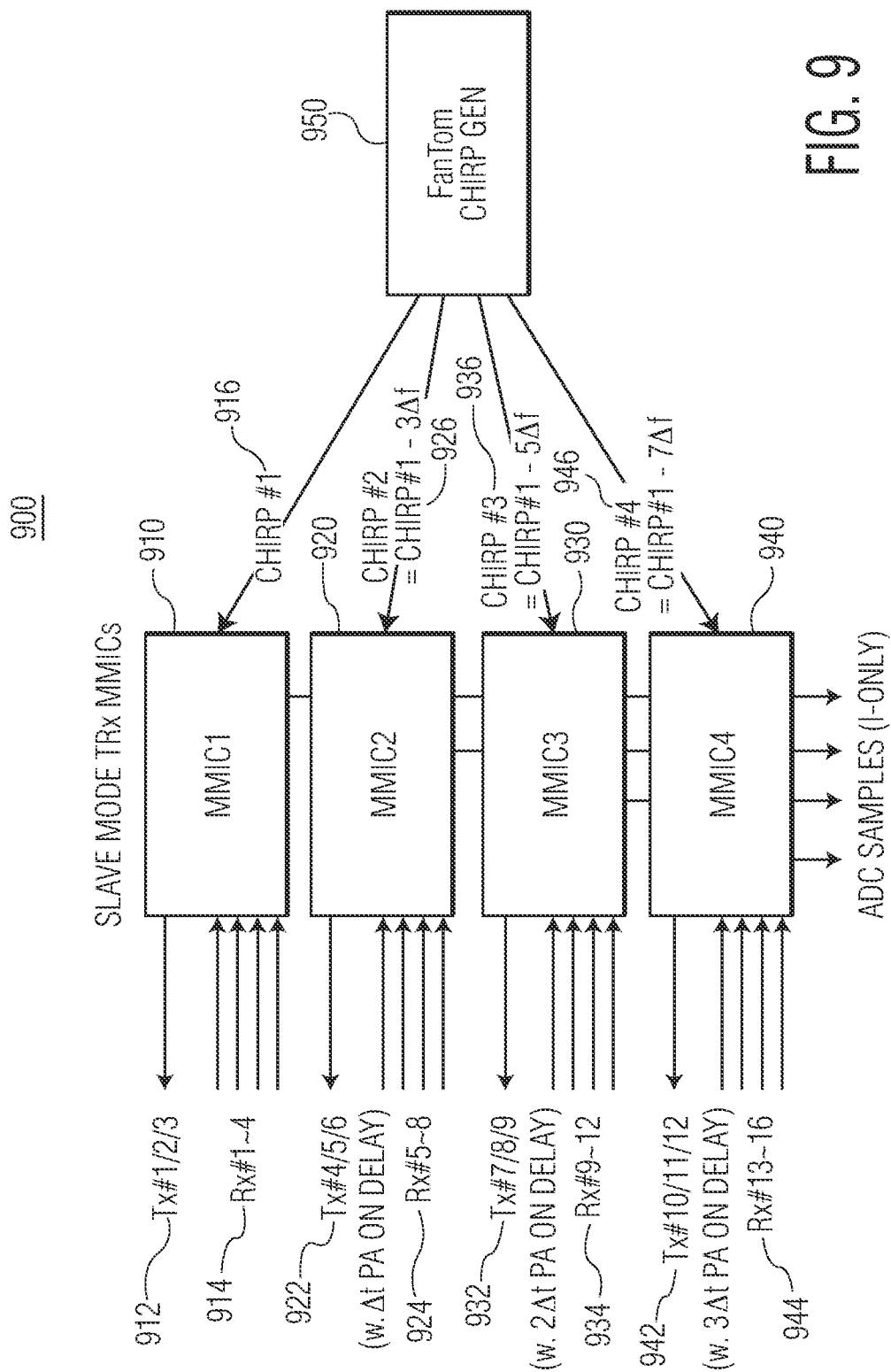
FIG. 9 is a simplified block diagram illustrating an example transceiver system in which a set of receive channels can use different reference chirps and any receive channel can use a reference chirp associated with a different transmitter than that of TX1.

FIG. 9 is a simplified block diagram illustrating an example transceiver system 900 in which a set of receive channels can use different reference chirps, and any receive channel can use a reference chirp associated with a different transmitter than that of TX1. Transceiver system 900 provides 12 transmit channels formed in groups of three and 16 receive channels formed in groups of four. One transmitter from each TX group is selected for FanTOM chirp transmission such that a range division MIMO factor of four can be achieved by transmitting four distinct chirps. While a TX channel of each group is transmitting, the two other TX channels of that group are switched off to prevent radiating. On receive, each group of four RX channels down mix the received RF signal with a distinct reference chirp corresponding to one of the FanTOM chirps transmitted by the four TX channels.

FIG. 9 illustrates such an arrangement using four transceiver ICs 910-940. Each of the transceiver ICs provides three TX channels (912, 922, 932, and 942, respectively) and four RX channels (914, 924, 934, and 944, respectively). These can execute in a slave mode by receiving FanTOM chirps from an external chirp generator 950. External chirp generator 950 can be configured to generate four distinct FanTOM chirps (e.g., 916, 926, 936, and 946) and transmit those chirps to the transceiver ICs 910, 920, 930, and 940. Each transceiver IC can transmit chirps corresponding to the fed FanTOM chirps and mix the received RF signal with that same chirp. In this manner, the individual transmitter signal can be extracted base on the following method.

As an example of the function of such a system, receivers 914 use FanTOM chirp #1 916 transmitted by Tx1, in group 912, as a reference chirp, receivers 924 use FanTOM chirp #2 926 transmitted by Tx4, in group 922, as a reference chirp, receivers 934 use FanTOM chirp #3 936 transmitted by Tx7, in group 932, as a reference chirp, and receivers 944 use FanTOM chirp #4 transmitted by Tx10, in group 942, as a reference chirp. The sections of the range spectrum of each receiver group corresponding to the transmit channel can be found according to the following mapping, assuming I/Q ADC sampling is available.

RX #1~4 with FanTOM Chirp #1@Tx1 as reference chirp:
 [0~$\Delta f$)→Tx1
 [$\Delta f$~2$\Delta f$)→Tx4
 [2$\Delta f$~3$\Delta f$)→Tx7
 [3$\Delta f$~4$\Delta f$)→Tx10

RX #5~8 with FanTOM Chirp #2@Tx4 as reference chirp:
 [−$\Delta f$~0)→Tx1
 [0~$\Delta f$)→Tx4
 [$\Delta f$~2$\Delta f$)→Tx7
 [2$\Delta f$~3$\Delta f$)→Tx10

RX #9~12 with FanTOM Chirp #3@Tx7 as reference chirp:
 [−2$\Delta f$~−$\Delta f$)→Tx1
 [−$\Delta f$~0)→Tx4
 [0~$\Delta f$)→Tx7
 [$\Delta f$~2$\Delta f$)→Tx10

RX #13~16 with FanTOM Chirp #4@Tx10 as reference chirp:
 [−3$\Delta f$~−2$\Delta f$)→Tx1
 [−2$\Delta f$~−f)→Tx4
 [−$\Delta f$~0)→Tx7
 [0~$\Delta f$)→Tx10

IF spectrum section mapping transmitter signals can then be separated and extracted for a MIMO virtual array construction.

Figure 10:
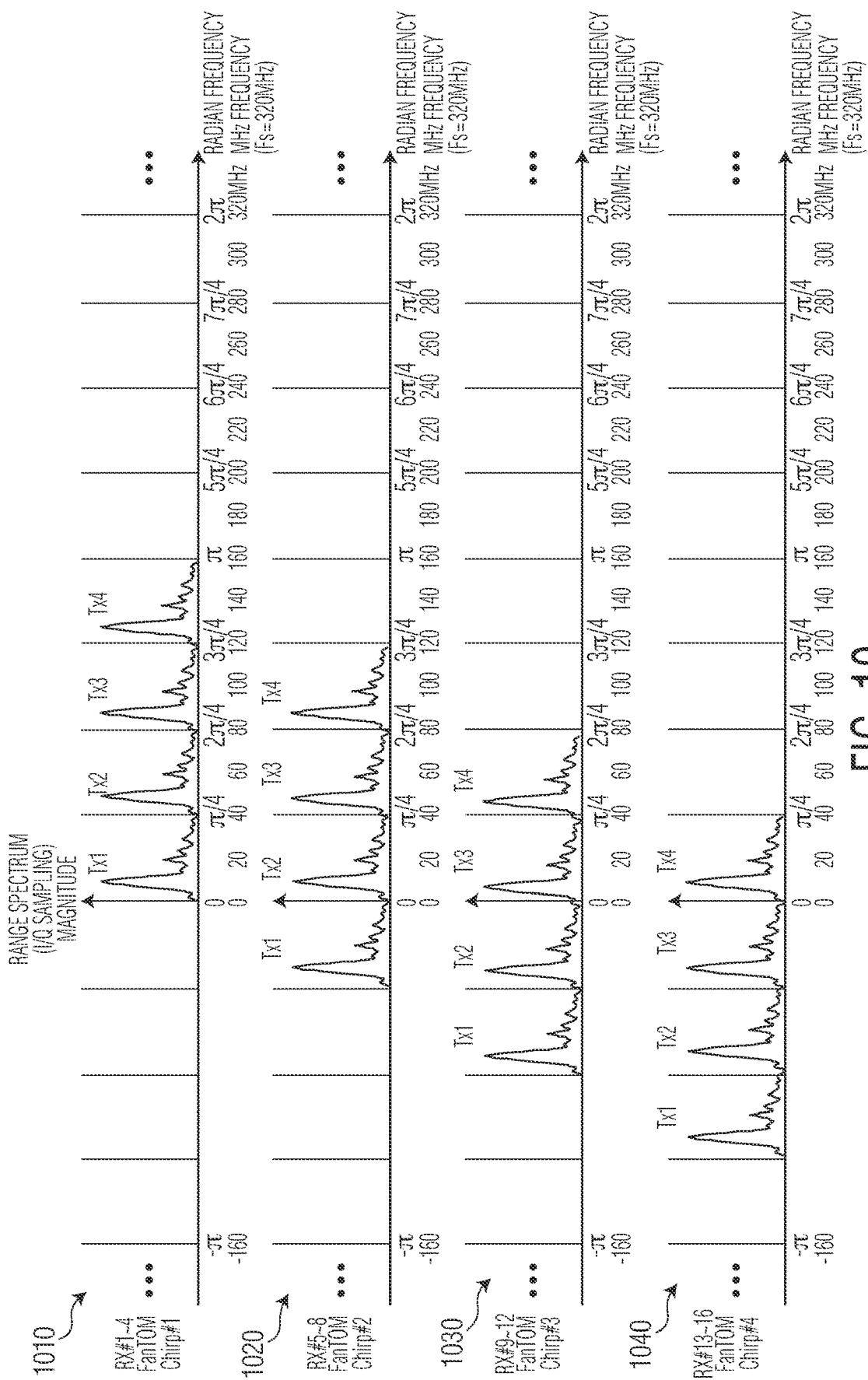
FIG. 10 is a range spectrum mapping illustrating reference chirp mixing with I/Q sampling, as discussed above.

FIG. 10 is a range spectrum mapping illustrating reference chirp mixing with I/Q sampling, as discussed above. Mapping 1010 illustrates the range spectrum mapping of receivers 1-4 from FanTOM chirp #1. Mapping 1020 illustrates the range spectrum mapping of receivers 5-8 from FanTOM chirp #2. Mapping 1030 illustrates the range spectrum mapping of receivers 9-12 from FanTOM chirp #3. Mapping 1040 illustrates the range spectrum mapping of receivers 13-16 from FanTOM chirp #4.

If only real-channel ADC samples are available, the mapping illustrated in FIG. 10 will not work because of the conjugate symmetric nature of the resulting spectrum. In such a case, the frequency offset between transmitters can be doubled to result in a staggered range division. In other words an empty space left between two transmitters such that the resulting conjugate symmetric spectrum does not result in an overlap.

Figure 11:
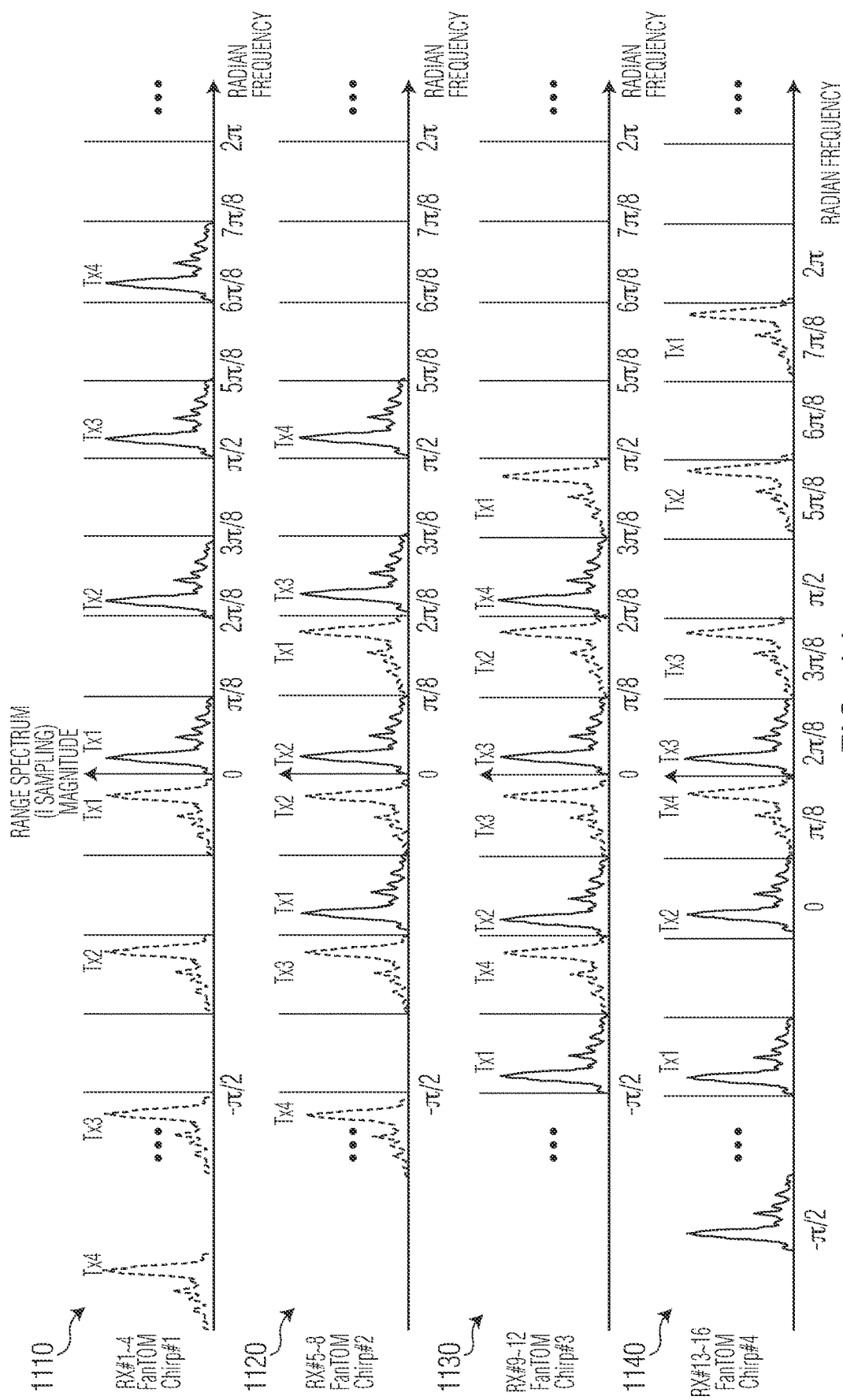
FIG. 11 is a range spectrum mapping illustrating reference chirp mixing with I/Q sampling, with a doubled frequency offset between transmitters, as discussed above.

FIG. 11 is a range spectrum mapping illustrating reference chirp mixing with I/Q sampling, with a doubled frequency offset between transmitters. Mapping 1110 illustrates the range spectrum mapping of receivers 1-4 from FanTOM chirp #1. Mapping 1120 illustrates the range spectrum mapping of receivers 5-8 from FanTOM chirp #2. Mapping 1130 illustrates the range spectrum mapping of receivers 9-12 from FanTOM chirp #3. Mapping 1140 illustrates the range spectrum mapping of receivers 13-16 from FanTOM chirp #4.

The arrangement illustrated in FIG. 9 can be useful for implementing FanTOM chirp RD MIMO using traditional LFM transceiver integrated circuits. For example, in the transceiver MMICs (e.g., 910, 920, 930, and 940), each is equipped with three transmit channels and for receive channels and can be programmed to run in a slave mode by receiving FanTOM chirps from an external chirp generator 950 providing distinctive FanTOM chirps for each MMIC. Additional power amplifier switching control is provided to ensure appropriate PA ON offset time is applied. As discussed above, each MMIC transmits chirps corresponding to the fed FanTOM chirps and mixes the received RF signal with the same chirp. Individual transmitter signals can still be extracted and corrected. The architecture illustrated in FIG. 9 provides benefits such as: 1) Tx-Rx spillover across different chips is minimized so zero-range spillover and non-zero IF frequency is less severe; and, 2) same-chip Tx-Rx spillover always results in zero IF, so a simple high-pass filter can be used to reduce the spillover.

Another advantage of the example architecture illustrated in FIG. 9 is that the three transmit channels can be configured to run in Time Division mode. In such a mode, an additional factor of three TD MIMO can be achieved such that a total of 12 MIMO Tx factor can be achieved from the four FanTOM RD with three TD MIMO processing. The 12 transmit MIMO coupled with the 16 receive channels provides a total of 192 virtual receive channels that can be constructed from the four traditional MMICs. This can significantly improve device resolution.

In an alternative embodiment, in applications in which controlling the direction of the radar signal is desirable, the three transmit channels on each MMIC can be configured to run in a beamforming mode. In the beamforming mode, all three transmit channels transmit the same FanTOM chirp with an additional phase shift to direct the transmit pattern at a desired illumination direction.

Figure 12A:
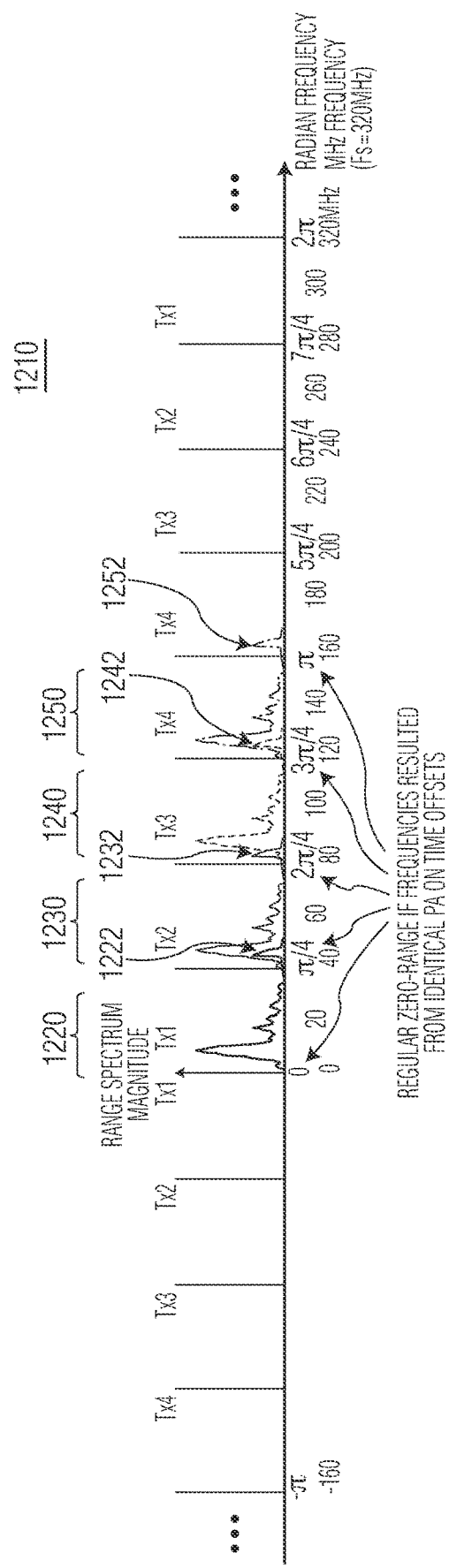
FIGS. 12A and 12B are range spectrum mappings illustrating results from varying power amplifier offset between transmitters, in accord with an example embodiment.
Figure 12B:
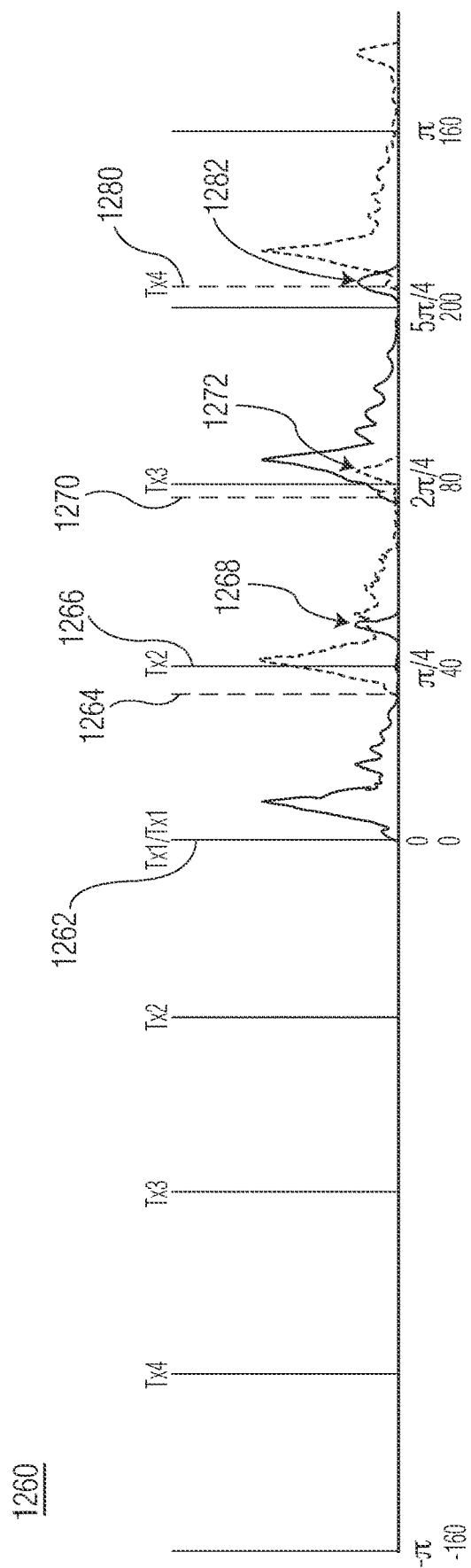

FIGS. 12A and 12B are a range spectrum mapping illustrating results from varying power amplifier offset between transmitters, in accord with an example embodiment. In certain situations, it can be desirable to be able to resolve the presence of a radar target having and ambiguous range beyond the maximum instrument range of the radar system. As illustrated in range spectrum mapping 1210 of FIG. 12A, a beyond-the-maximum-range target will show up in the range spectrum of an adjacent transmitter and thus be detected is a return from the adjacent transmitters illumination instead of the correct illuminator. As an example, target echo 1222 results from a beyond-the-maximum-range target illuminated by the transmitter associated with the portion of range spectrum 1220. Similarly, target echo 1232 results from the same target illuminated by the transmitter associated with the portion of range spectrum 1230. Likewise, target echo 1242 results from the target illuminated by the transmitter associated with the portion of range spectrum 1240, and target echo 1252 results from the target illuminated by the transmitter associated with the portion of range spectrum 1250. In light of the echo appearing in a neighboring transmitter's portion of the range spectrum, an ambiguity arises as to whether the target echo is associated with the transmitter for that portion of the range spectrum or the neighboring transmitter.

To overcome such an ambiguity, an embodiment is provided that varies the power amplifier ON offset between transmitters, so the amounts of offsets are not identical. Thus, when an ambiguous range occurs, the measured ambiguity between each transmitter portion of the spectrum range varies, thereby increasing the probability of detection of an echo from a beyond-the-maximum-range target. This is illustrated in range spectrum mapping 1260 of FIG. 12B. When varying the power amplifier ON offset time is engaged, the echo associated with beyond-the-maximum-range target shows up at differing ranges in the adjacent transmitter range spectrum. For example, the first transmitter signal originates at 1262, while the second transmitter signal originates at 1264, which is earlier than the identical power amplifier ON offset that would have been at 1266. Similarly, a third transmitter signal originates at 1270, which is also earlier than the identical power on offset would have been, but less so than that of 1264. An echo from a beyond-the-maximum-range target is illustrated at 1268. An echo from the same target, but from the second transmitter signal, is illustrated at 1272. The echo from the third transmitter is illustrated at 1282, subsequent to a transmission from a fourth transmitter at 1280. As illustrated, each echo from the beyond-the-maximum-range target shows up at differing ambiguous ranges in the adjacent transmitters range spectrum such that the target can be distinguished from normal targets. Normal targets will have a consistent range with respect to all transmitters. By checking the consistency of detected range across transmitters, and ambiguous target can be identified based on the inconsistency. In this manner, the beyond-the-maximum-range target can be ignored or otherwise processed.

Embodiments of the present invention provide a frequency and time offset modulation with increased ADC sampling to allow a separation in the range spectrum of transmitter signals at reception. This combination enables construction of very large MIMO arrays, unlike the prior art.

By now it should be appreciated that there has been provided a method for operating a radar system. The method includes generating a reference signal at a transmitter module, generating a frequency offset signal of the reference signal for each of N transmitters of the radar system where each transmitter is associated with a distinct frequency offset for the frequency offset signal, transmitting from each of the N transmitters in sequence the frequency offset signal as a RF encoded transmit signal, receiving at one of M receiving antennas of a receiver module a target return signal reflected from the N radiofrequency encoded transmit signals by a target, mixing the target return signal with the reference signal at the receiver module to produce an intermediate frequency signal, converting the intermediate frequency to a digital signal with an analog-to-digital converter at the receiver module, and processing the digital signal to generate a range spectrum comprising N segments that correspond respectively to the N radiofrequency encoded transmit signals transmitted over the N transmitters. The transmitting starts at a distinct time for each transmitter. The difference in the starting time of the transmission for each transmitter is at least equivalent to a round-trip delay associated with a predetermined maximum range of the radar system.

In one aspect, generating the reference signal includes providing the reference signal for a duration of the RF encoded transmit signal (Tc) plus four times the difference in the starting time of the transmission for each transmitter ($\Delta t$), and providing the reference signal starting at a first frequency(fstart) and ending at fstart+S*Tc+3*(S*$\Delta t$), wherein S is a slope of the reference signal.

In another aspect, generating the frequency offsets signal includes determining a frequency offset of $-(K-1)*\Delta f$, wherein K is a numerical identifier of the sequence of the transmitter from 0 to N and $\Delta f$ is S*$\Delta t$, and applying the frequency offset to the reference signal. In a further aspect, applying the frequency offset to the reference signal is performed using a frequency offset mixer. In another further aspect, generating the reference signal and generating the frequency offset signal are performed using a separate frequency offset signal generator for each of the N transmitters. In yet another further aspect, applying the frequency offset to the reference signal is performed using a separate phase shifter for each of the N transmitters.

In another aspect of the above embodiment, transmitting from each of the N transmitters in sequence includes providing and offset ON signal to a power amplifier associated with each of the N transmitters. In still another aspect of the above embodiment, transmitting from each of the N transmitters in sequence includes providing the frequency offset signal of the reference signal associated with the transmitter to a power amplifier associated with the transmitter at the distinct time for that transmitter. In yet another aspect, transmitting from each of the N transmitters in sequence includes providing the RF encoded transmit signal generated by a power amplifier associated with the transmitter to an antenna associated with the transmitter at the distinct time for that transmitter. In another aspect, the method further includes one of filtering the intermediate frequency signal to remove zero-range interference in a fast-time spectrum of each transmitter; filtering, using a low pass filter and notch filter, the intermediate frequency to remove zero-range interference in a fast-time spectrum of each transmitter; and, directly cancelling the coupled-in transmit signal using a known spillover amplitude and phase.

In another aspect of the above embodiment, processing the digital signal to generate a range spectrum comprising N-segments that correspond, respectively to the N radio frequency encoded transmit signals transmitted over the N transmitters includes: extracting the range spectrum of each of the N transmitters from a range spectrum of the N radio frequency encoded transmit signals; forming a Doppler spectrum for each range spectrum (over multiple transmit cycles); performing detection of the target return signal in each Doppler spectrum transmitter/receiver pair; forming a range-division MIMO virtual antenna measurement vector from the detected target return signals; and, generating a target angle using the formed range-division MIMO virtual antenna measurement vectors.

Another embodiment provides a radar system that includes: a reference signal generator configured to produce a reference signal linear in frequency over time; a frequency offset signal generator, coupled to each of N transmitters of the radar system, and configured to generate a frequency offset signal of the reference signal, where each transmitter is associated with a distinct frequency offset for the frequency offset signal; the N transmitters of the radar system are each configured to transmit the associated frequency offset signal as a RF encoded transmit signal sequentially from each other transmitter, where each transmitter is configured to transmit the associated frequency offset signal at a distinct time, and the difference in the starting time of the transmission for each transmitter is at least equivalent to a round trip delay associated with a predetermined maximum range of the radar system; a receiver module that includes a first receive antenna configured to receive a target return signal reflected by a target from N RF encoded transmit signals associated with the N transmitters, a mixer circuit configured to mix the target return signal with the reference signal to produce an intermediate frequency signal, and an analog-to-digital converter configured to convert the intermediate frequency signal to a digital signal; and, a radar control processing unit configured to process the digital signal to generate a range spectrum including N segments that correspond, respectively, to the N RF encoded transmit signals transmitted over the N transmitters.

In one aspect of the above embodiment, the reference signal generator produces the reference signal by being configured to provide the reference signal for a duration of the RF encoded transmit signal (Tc) plus four times the difference in the starting time of the transmission for each transmitter ($\Delta t$), and provide the reference signal starting at a first frequency (fstart) and ending at fstart+S*Tc+3*(S*$\Delta t$), wherein S is a slope of the reference signal.

In another aspect, the frequency offset generator generates the frequency offset signal by being configured to determine a frequency offset of $-(K-1)*\Delta f$, wherein K is a numerical identifier of the sequence of the transmitter from 0 to N and $\Delta f$ is S*$\Delta t$, and apply the frequency offset to the reference signal. In a further aspect, the radar system further includes a frequency offset mixer, coupled to the frequency offset generator, and configured to apply the frequency offset to the reference signal. In another further aspect, the radar system further includes a separate frequency offset signal generator for each of the N transmitters. In still another further aspect, the radar system further includes a separate phase shifter associated with each of the N transmitters and configured to apply the frequency offset to the reference signal.

In another aspect of the above embodiment, each of the N transmitters includes a power amplifier configured to provide a signal in response to an ON signal provided to the power amplifier. Transmitting from each of the N transmitters in sequence includes providing a time offset ON signal to each power amplifier at the distinct starting time for the associated transmitter for a period of time Tc. In yet another aspect of the above embodiment, each of the N transmitters includes a switch configured to control the frequency offset signal of the reference signal to a power amplifier associated with the transmitter. Transmitting from each of the N transmitters and sequence includes configuring the switch to provide the frequency offset signal to the power amplifier at the distinct starting time for the associated transmitter for a period of time Tc. In another aspect of the above embodiment, each of the N transmitters includes an antenna and a switch configured to control a signal generated by a power amplifier associated with the transmitter from arriving at the antenna. Transmitting from each of the N transmitters in sequence includes configuring the switch to provide the power amplifier signal to the antenna at the distinct starting time for the associated transmitter for a period of time Tc.

Another embodiment provides a radar system that includes a first plurality of transmitters, a second plurality of receivers, and a radar control processing unit. Each transmitter of the first plurality of transmitters is configured to: receive a reference signal that is linear in frequency over time; generate a frequency offset signal of the reference signal where each transmitter of the first plurality of transmitters is associated with a distinct frequency offset for the frequency offset signal; and transmit the frequency offset signal as a RF encoded transmit signal at a distinct time for that transmitter where the difference in starting time of the transmission for each transmitter is at least equivalent to a round trip delay associated with a predetermined maximum range of the radar system. Each receiver of the second plurality of receivers is configured to: receive, at an antenna, a target return signal reflected by a target from the first plurality of RF encoded transmit signals associated with the first plurality of transmitters; mix the target return signal with the reference signal to produce an intermediate frequency signal; and, convert the intermediate frequency signal to a digital signal. The radar control processing unit is configured to process the digital signal to generate a range spectrum including a first plurality of segments that correspond, respectively, to the first plurality of RF encoded transmit signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below. For example, differing numbers of transmitters and receivers can be changed according to the application. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for operating a radar system, the method comprising:
   generating a reference signal at a transmitter module;
   generating a frequency offset signal of the reference signal for each of N transmitters of the radar system, wherein each transmitter is associated with a distinct frequency offset for the frequency offset signal;
   transmitting from each of the N transmitters in sequence the frequency offset signal as a RF encoded transmit signal, wherein
      providing an offset ON signal to a power amplifier associated with each of the N transmitters,
      said transmitting starts at a distinct time for each transmitter, and
      the difference in the starting time of the transmission for each transmitter is at least equivalent to a round trip delay associated with a predetermined maximum unambiguous range of the radar system;
   receiving, at one of M receiving antennas of a receiver module, a target return signal reflected from the N radio frequency encoded transmit signals by a target;
   mixing the target return signal with the reference signal at the receiver module to produce an intermediate frequency signal;
   converting the intermediate frequency to a digital signal with an analog-to-digital converter at the receiver module; and
   processing the digital signal to generate a range spectrum comprising N segments that correspond, respectively, to the N radio frequency encoded transmit signals transmitted over the N transmitters,
   wherein generating the reference signal comprises:
      providing the reference signal for a duration of an RF encoded transmit signal (Tc) plus X times the difference in the starting time of the transmission for each transmitter ($\Delta t$), wherein X is a whole number; and
      providing the reference signal starting at a first frequency (fstart) and ending at fstart+S*Tc+(X-1)* (S*$\Delta t$), wherein S is a slope of the reference signal.

2. The method of claim 1, wherein said generating the frequency offset signal comprises:
   determining a frequency offset of -(K-1)*$\Delta f$, wherein K is a numerical identifier of the sequence of the transmitter from 0 to N and $\Delta f$ is S*$\Delta t$, wherein S is a slope of the reference signal and $\Delta t$ is the difference in the starting time of the transmission for each transmitter; and
   applying the frequency offset to the reference signal.

3. The method of claim 2, wherein said applying the frequency offset to the reference signal is performed using a frequency offset mixer.

4. The method of claim 2, wherein said generating the reference signal and said generating the frequency offset signal are performed using a separate frequency offset signal generator for each of the N transmitters.

5. The method of claim 2, wherein said applying the frequency offset to the reference signal is performed using a separate phase shifter for each of the N transmitters.

6. The method of claim 1, wherein said transmitting from each of the N transmitters in sequence comprises:
   providing the frequency offset signal of the reference signal associated with the transmitter to a power amplifier associated with the transmitter at the distinct time for that transmitter.

7. The method of claim 1, wherein said transmitting from each of the N transmitters in sequence comprises:
   providing the RF encoded transmit signal output by a power amplifier associated with the transmitter to an antenna associated with the transmitter at the distinct time for that transmitter.

8. The method of claim 1 further comprising one of:
   filtering, using a notch filter, the intermediate frequency signal to remove zero-range interference in a fast-time spectrum of each transmitter;
   filtering, using a low pass filter and a notch filter, the intermediate frequency to remove zero-range interference in a fast-time spectrum of each transmitter; and
   directly cancelling the coupled-in transmit signal using a known spillover amplitude and phase.

9. The method of claim 1, wherein said processing the digital signal to generate a range spectrum comprising N segments that correspond, respectively, to the N radio frequency encoded transmit signals transmitted over the N transmitters comprises:
   extracting the range spectrum of each of the N transmitters from a range spectrum of the N radio frequency encoded transmit signals;
   forming a Doppler spectrum for each range spectrum (over multiple transmit cycles);
   performing detection of the target return signal in each Doppler spectrum transmitter/receiver pair;
   forming a range-division MIMO virtual antenna measurement vector from the detected target return signals;
   generating a target angle using the formed range-division MIMO virtual antenna measurement vectors.

10. A radar system comprising:
    a reference signal generator configured to produce a reference signal linear in frequency over time;
    a frequency offset signal generator, coupled to a subset of a number N-1 transmitters of a number N transmitters of the radar system, and configured to generate a frequency offset signal of the reference signal, wherein each transmitter of the subset of N-1 transmitters is associated with a distinct frequency offset for the frequency offset signal;

the N transmitters of the radar system each configured to transmit the associated frequency offset signal as a RF encoded transmit signal sequentially from each other transmitter, wherein
- each transmitter is configured to transmit the associated frequency offset signal at a distinct time, and
- the difference in the starting time of the transmission for each transmitter is at least equivalent to a round trip delay associated with a predetermined maximum unambiguous range of the radar system;

a receiver module comprising
- a first receive antenna configured to receive a target return signal reflected by a target from N RF encoded transmit signals associated with the N transmitters,
- a mixer circuit configured to mix the target return signal with the reference signal to produce an intermediate frequency signal, and
- an analog-to-digital converter configured to convert the intermediate frequency signal to a digital signal; and a radar control processing unit configured to process the digital signal to generate a range spectrum comprising N segments that correspond, respectively, to the N RF encoded transmit signals transmitted over the N transmitters, wherein the reference signal generator is configured to produce the reference signal by being configured to:
- provide the reference signal for a duration of the RF encoded transmit signal (Tc) plus X times the difference in the starting time of the transmission for each transmitter ($\Delta t$), wherein X is a whole number; and
- provide the reference signal starting at a first frequency (fstart) and ending at fstart+S*Tc+(X-1)*(S*$\Delta t$), wherein S is a slope of the reference signal.

11. The radar system of claim 10, wherein the frequency offset generator generates the frequency offset signal by being configured to:
- determine a frequency offset of $-(K-1)*\Delta f$, wherein K is a numerical identifier of the sequence of the transmitter from 0 to N and $\Delta f$ is S*$\Delta t$, wherein S is a slope of the reference signal and $\Delta t$ is the difference in the starting time of the transmission for each transmitter; and
- apply the frequency offset to the reference signal.

12. The radar system of claim 11 further comprising:
a frequency offset mixer, coupled to the frequency offset generator, and configured to apply the frequency offset to the reference signal.

13. The radar system of claim 11 further comprising one of
- a separate frequency offset signal generator for each of the N transmitters; and
- a separate phase shifter associated with each of the N transmitters and configured to apply the frequency offset to the reference signal.

14. The radar system of claim 10, wherein each of the N transmitters comprises:
a switch configured to control the frequency offset signal of the reference signal to a power amplifier associated with the transmitter, wherein
said transmitting from each of the N transmitters in sequence comprises configuring the switch to provide the frequency offset signal to the power amplifier at the distinct starting time for the associated transmitter for a period of time Tc.

15. The radar system of claim 10, wherein each of the N transmitters comprises:
an antenna; and
a switch configured to control a signal generated by a power amplifier associated with the transmitter from arriving at the antenna, wherein
said transmitting from each of the N transmitters in sequence comprises configuring the switch to provide the power amplifier signal to the antenna at the distinct starting time for the associated transmitter for a period of time Tc.

16. A radar system comprising:
a plurality of transmitters, wherein each transmitter is configured to
- receive a reference signal that is linear in frequency over time,
- generate a frequency offset signal of the reference signal, wherein each transmitter of the plurality of transmitters is associated with a distinct frequency offset for the frequency offset signal,
- provide an offset ON signal to a power amplifier associated with each of the N transmitters,
- transmit the frequency offset signal as a RF encoded transmit signal at a distinct time for that transmitter, wherein the difference in the starting time of the transmission for each transmitter is at least equivalent to a round trip delay associated with a predetermined maximum unambiguous range of the radar system;

a plurality of receivers, wherein each receiver is configured to
- receive, at an antenna, a target return signal reflected by a target from the first plurality of RF encoded transmit signals associated with the plurality of transmitters,
- mix the target return signal with the reference signal to produce an intermediate frequency signal, and
- convert the intermediate frequency signal to a digital signal; and a radar control processing unit configured to process the digital signal to generate a range spectrum comprising a first plurality of segments that correspond, respectively, to the first plurality of RF encoded transmit signals, wherein the reference signal has a duration of the RF encoded transmit signal (Tc) plus X times the difference in the starting time of the transmission for each transmitter ($\Delta t$), wherein X is a whole number, and wherein the reference signal starts at a first frequency (fstart) and ends at fstart+S*Tc+(X-1)*(S*$\Delta t$), wherein S is a slope of the reference signal.

* * * * *